(12) United States Patent
Dedrick

(10) Patent No.: US 6,694,717 B1
(45) Date of Patent: Feb. 24, 2004

(54) COMBINATION GARDEN TOOL

(76) Inventor: Ted Dedrick, 14135 Campo Rd., Jamul, CA (US) 91935

(*) Notice: Subject to any disclaimer, the term of this patent is extended or adjusted under 35 U.S.C. 154(b) by 0 days.

(21) Appl. No.: 10/292,878

(22) Filed: Nov. 13, 2002

(51) Int. Cl.$^7$ .............................. A01D 7/00; B25F 1/00
(52) U.S. Cl. ......................................... 56/400.04; 7/114
(58) Field of Search ............... 56/400.05, 400.04, 56/400.06; 7/114, 115, 116

(56) References Cited

U.S. PATENT DOCUMENTS

| | | | | |
|---|---|---|---|---|
| 83,071 A | * | 10/1868 | Linnemann | 7/116 |
| 1,504,913 A | * | 8/1924 | Simoncelli | 294/52 |
| 1,882,288 A | * | 10/1932 | Lee | 7/116 |
| 2,314,685 A | * | 3/1943 | Brooke | 285/154.3 |
| 4,212,150 A | * | 7/1980 | Dmochowski | 56/400.06 |
| 4,232,422 A | * | 11/1980 | Fellmann | 16/427 |
| 4,565,398 A | * | 1/1986 | Poulin | 294/52 |
| 4,606,089 A | * | 8/1986 | King | 7/114 |
| 5,609,215 A | * | 3/1997 | Rios et al. | 172/373 |
| 6,367,236 B1 | * | 4/2002 | Marcone | 56/400.12 |
| D467,140 S | * | 12/2002 | Dedrick | D8/10 |

FOREIGN PATENT DOCUMENTS

| SE | 580 | * | 1/1887 | 56/400.05 |
|---|---|---|---|---|
| SE | 41052 | * | 7/1916 | 56/400.05 |

* cited by examiner

Primary Examiner—Thomas B. Will
Assistant Examiner—Alicia Torres
(74) Attorney, Agent, or Firm—Charles C. Logan, II

(57) ABSTRACT

A combination garden tool having an elongated handle having a tubular sheath connected to its bottom end. A push hoe blade has a shank that is connected to the bottom end of the tubular sheath. The push hoe blade has a foot flange formed along its top edge to provide a platform against which the garden tool's user can push his foot when using the garden tool as a shovel, a push hoe or an edger. The rake head has its top end pivotally connected to the handle adjacent its bottom end. A rake head can be rotated from a stored position to a working position. There is structure for locking the rake head in both the stored position and the operating position.

7 Claims, 2 Drawing Sheets

COMBINATION GARDEN TOOL

BACKGROUND OF THE INVENTION

The invention relates to a garden tool and more specifically to a combination garden tool capable of functioning as a shovel, an edger, a hoe and a rake.

Presently most people having a garden or a yard that needs periodic care have individual tools for performing the functions of digging, edging, hoeing and raking. This means four different garden tools must be purchased. Also once purchased, there is the need to maintain and store four tools in ones garage or storage shed. Having four separate tools also means the gardener must carry the tools to the work area and also carry them back for storage.

It is an object of this invention to provide a novel combination garden tool that can function as a shovel, an edger, a hoe and a rake.

It is also an object of the invention to provide a novel combination garden tool that has a rake head that can be pivoted from a stored position to a position where it can function as a rake for the user of the garden tool.

It is another object of the invention to provide a novel combination garden tool that can function as a push hoe.

It is an additional object of the invention to provide a novel combination garden tool that is economical to manufacture and market.

It is a further object of the invention to provide a novel combination garden tool that requires minimal storage space when compared to the four different tools it replaces.

SUMMARY OF THE INVENTION

The combination garden tool has an elongated handle having a push hoe blade secured to its bottom end. The push hoe blade has an upper planar member that is connected to a lower planar member at an obtuse angle. The push hoe blade is not oriented at a ninety degree angle as is the normal case with a conventional hoe. Also the top edge of the upper planar member has a laterally extending foot flange to provide a platform against which the garden tool user can use his foot when using the garden tool as a shovel, as an edger, or as a push hoe.

A rake head is pivotally secured to the handle of the combination garden tool so that it can store the rake head in an upper out of the way storage position when the garden tool is used for operations such as digging, edging, or hoeing. When the rake head is pivoted down to its lower position, the tines of the rake head extend in a direction opposite from that of the push hoe blade and the combination garden tool can be used in the normal manner of a rake. Two different embodiments of the rake head are illustrated with different methods for locking the rake head in its upper stored position and also in its lower position for functioning as a rake.

DESCRIPTION OF THE PREFERRED EMBODIMENT

Figures 1, 2:
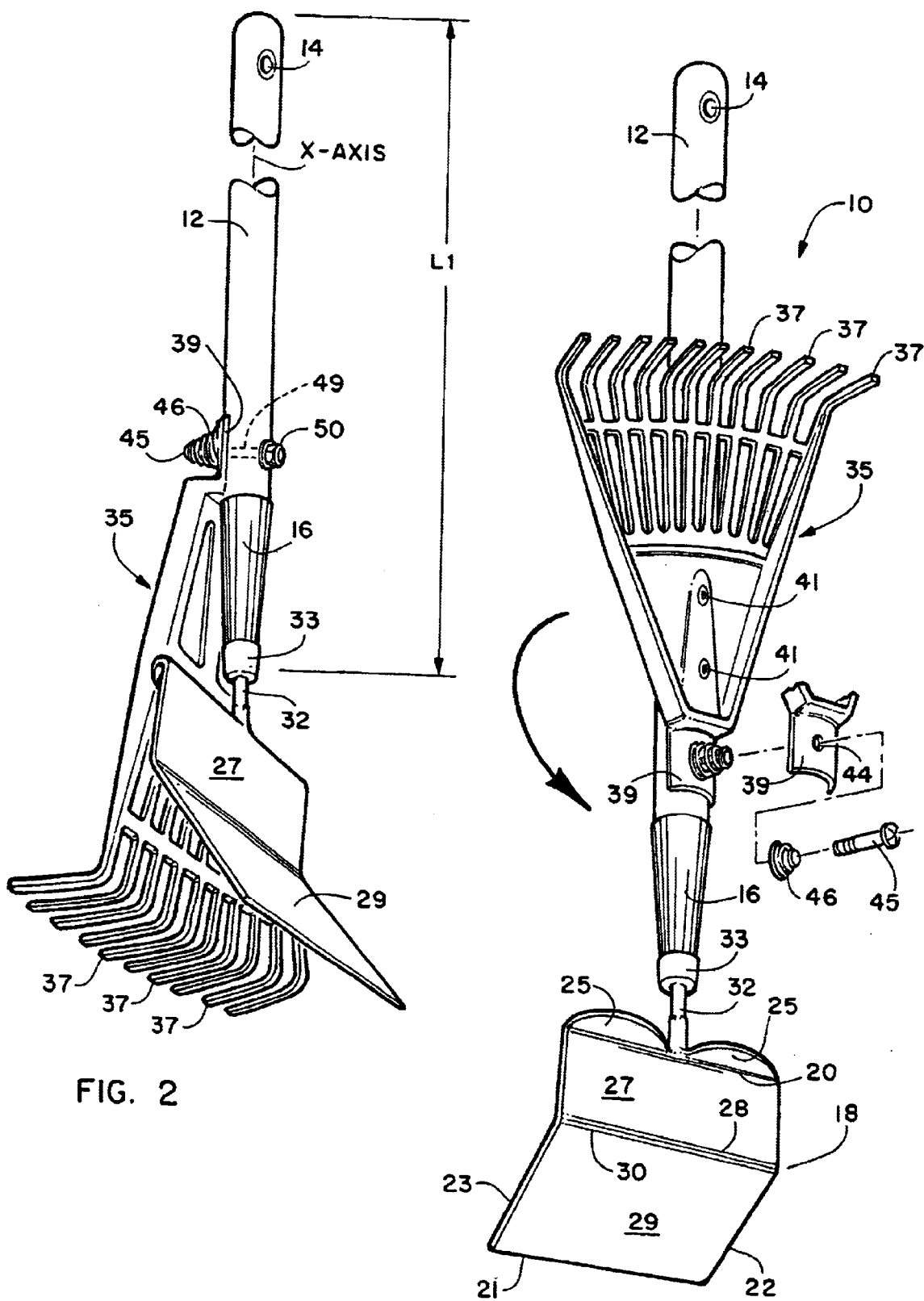
FIG. 1 is a front perspective view of the combination garden tool with the rake head in its stored position.
FIG. 2 is a rear perspective view of the combination garden tool showing the rake head in its lowered rake functioning position.

The combination garden tool will now be described by referring to FIGS. 1–5 of the drawings. The combination garden tool is generally designated numeral 10.

Combination garden tool 10 has an elongated handle 12 having an axially extending longitudinal X-axis. Handle 12 has a length L1 and L1 is in the range of 3–7 feet. An aperture or bore hole 14 passes transversely through handle 12 adjacent its top end so that the combination garden tool can be hung from a hook or nail when not being used.

A tubular sheath 16 is rigidly secured on the bottom end of handle 12. A push hoe blade 18 is secured to the bottom end of handle 12 within tubular sheath 16. Push hoe blade 18 has a top edge 20, a bottom edge 21, a left edge 22 and a right edge 23. A foot flange 25 extends laterally from the top edge 20 to provide a platform against which the garden tool's user can push his foot when using the garden tool as a shovel, a push hoe or an edger. Push hoe blade 18 has an upper planar member 27 having a bottom edge 28. Lower planar member 29 has an upper edge 30. Upper planar member 27 intersects lower planar member 29 at an obtuse angle A. Push hoe blade 18 has a shank 32 extending up from its top end through a sleeve 33 thereon connected to the bottom end of tubular sheath 16.

Rake head 35 has a plurality of tines 37 on its front end. An attachment member 39 is connected to rake head 35 by a plurality of rivets 41. Attachment member 39 has an aperture 44. A bolt 45 is inserted through coiled spring 46, aperture 44, aligned bore hole 49 and secured in place by a nut 50. The bottom end of attachment member 39 has a concave bottom surface that mates with the convex outer surface of handle 12. Rake head 35 can be rotated from its stored position by compressing coiled spring 46 and then rotating the rake head 35 to its lowered rake functioning position. Once the coiled spring 46 is allowed to relax to its expanded position, rake head 35 will be held rigidly in its lower position.

Figures 3, 4, 5:
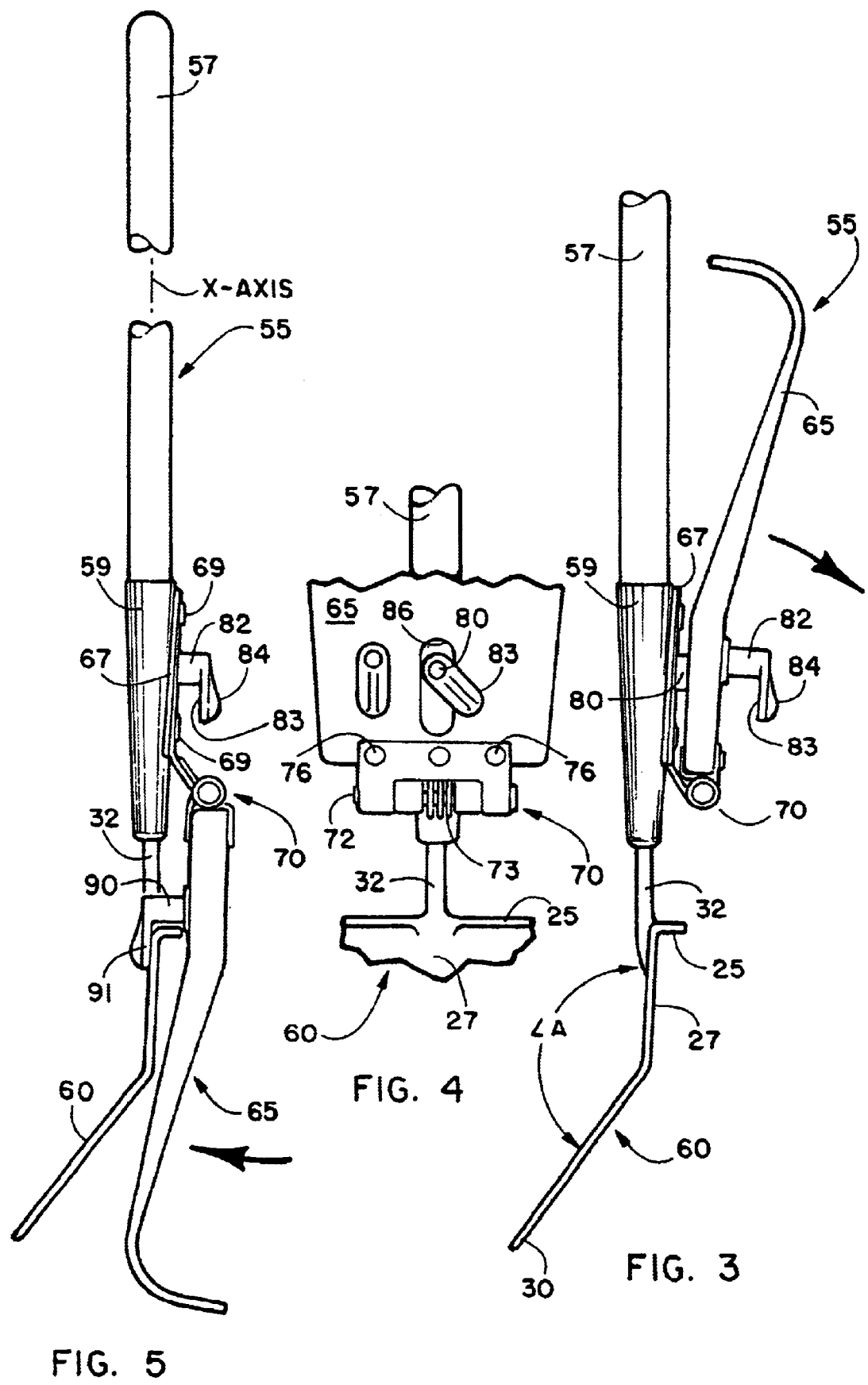
FIG. 3 is a side elevation view of a first alternative embodiment of the combination garden tool with the rake head in its stored position.
FIG. 4 is a partial front elevation view of the first alternative embodiment of the combination garden tool illustrated in FIG. 3.
FIG. 5 is a side elevation view of the first alternative embodiment of the combination garden tool showing the rake head in its lowered rake functioning position.

An alternative embodiment combination garden tool is illustrated in FIGS. 3–5 and is generally designated numeral 55. It has an elongated handle 57 having a longitudinally extending X-axis. A tubular sheath 59 is rigidly secured on its bottom end. A push hoe blade 60 has a structure similar to that described in FIGS. 1 and 2 and it will be described as having the same numerals. This hoe blade 60 has an upper planar member 27 and a lower planar member 30 that intersect each other at an obtuse angle A. The foot flange 25 is formed adjacent the top edge of upper planar member 27. A shank 32 connects the push hoe blade to the bottom end of handle 57 within tubular sheath 59.

Rake head 65 is shown in its upper stored position in FIGS. 3 and 4. Rake attachment plate 67 is secured to the outer surface of tubular sheath 59 by rivets 69. The bottom ends of rake attachment plate 67 is connected to hinge assembly 70 having a hinge pin 72 and a return spring 73. Hinge assembly 70 is connected to the rake head 65 by a plurality of rivets 76.

The structure for holding rake head 65 in its stored position will be discussed by referring to FIGS. 3 and 4. A pin 80 has its rear end secured to rake attachment plate 67. A post 82 is rotatably mounted on pin 80 and it has an arm 83 having a ridge 84 on its top surface. A slot 86 is formed in rake head 65. Post 82 and arm 83 extend outwardly through slot 86 and when rotated laterally will hold rake head 65 in its stored position.

The manner in which the rake head 65 is rigidly secured in its lowered rake functioning position will be described by referring to FIG. 5. A post 90 having an arm 91 is pivotally secured to the rear surface of rake head 65. When rake head 65 is in its lowered position the arm 91 is pivoted so that it engages the rear surface of upper planar member 27 and locks it in the down position.

What is claimed is:

1. A combination garden tool comprising:

an elongated handle having a front end, a rear end, an outer surface, a longitudinally extending X-axis and a length L1;

an elongated tubular sheath having a front end, a rear end and an outer surface;

said front end of said handle is telescopically received in said rear end of said tubular sheath and secured thereto;

a push-hoe blade having a top edge, a bottom edge, a left edge and a right edge; a transversely extending foot flange connected to said top edge to provide a platform against which the garden tool's user can push his foot when using the garden tool as a shovel or a push hoe;

first connecting means connecting said top end of said push-hoe blade to said front end of said handle;

an elongated rake head having a top surface, a bottom surface, a front end, a rear end, and a plurality of tines;

second connection means connecting said rake head to said combination garden tool adjacent said front end of said elongated handle comprising: an attachment plate and a hinge assembly; said attachment plate having a top surface, a bottom surface and a bottom end; fastening means securing said bottom surface of said attachment plate to said outer surface of said tubular sheath; said hinge assembly having a top end and a bottom end; said top end connected to said top surface of said attachment plate adjacent said bottom end of said attachment plate; said bottom end of said hinge assembly being connected to said rear end of said rake head; said hinge assembly providing structure for pivoting said rake head to an upper stored position and pivoting said rake head to a lower rake functioning position;

means for releasably locking said rake head in said upper stored position comprising: an elongated slot formed in said rake head adjacent said rear end; a first pin having a top end and a bottom end; said bottom end being connected to said top surface of said attachment plate, a first post is rotatably mounted on said first pin, a first arm extends transversely from said top end of said first post; said first post and said first arm are passed through said slot and said first arm is pivoted laterally to lock said rake head in said stored position; and means for releasably locking said rake head in said lowered rake functioning position comprising: a second post having a top end and a bottom end, said post being rotatably mounted on said top surface of said rake head adjacent said rear end of said rake head; a second arm extends transversely from said top end of said second post; when said rake head is pivoted to said lowered rake functioning position, said second arm is pivoted laterally to lock said rake head to said top edge of said push-hoe blade.

2. A combination garden tool as recited in claim 1 wherein L1 is in the range of 3–7 feet.

3. A combination garden tool as recited in claim 1 further comprising a second bore hole passing transversely through said elongated handle adjacent said rear end of said handle for hanging said garden tool on a hook or nail.

4. A combination garden tool as recited in claim 1 wherein said tubular sheath has a tapered width from said rear end of said tubular sheath to said front end of tubular sheath.

5. A combination garden tool as recited in claim 1 wherein said rake head is made of molded plastic material.

6. A combination garden tool as recited in claim 1 wherein said push-hoe blade has an upper planar member and a lower planar member; said upper planar member having a lower edge and said lower planar member having an upper edge and said respective lower edge and upper edge intersect each other at an obtuse angle.

7. A combination garden tool as recited in claim 6 wherein said foot flange, said upper planar member and said bottom planar member are integrally formed of metal material.

* * * * *